June 7, 1932.  F. D. WILLIAMS  1,861,515

PROCESS OF PRINTING MOTION PICTURES

Filed April 18, 1927

INVENTOR.
Frank D. Williams,
BY
ATTORNEYS
Westall and Wallace

UNITED STATES PATENT OFFICE

FRANK D. WILLIAMS, OF LOS ANGELES, CALIFORNIA

PROCESS OF PRINTING MOTION PICTURES

Application filed April 18, 1927. Serial No. 184,622.

This invention relates to a method of toning and harmonizing light in a photograph and is especially applicable to motion pictures.

Photographs or negatives are often retouched to harmonize lights and to accentuate, subdue, or blend certain objects on the picture. Retouching is more especially resorted to in still photography. In motion picture work, due to the great number of pictures and their size, retouchng is impracticable. My invention relates to a process for adjusting the light used in printing so as to vary the light intensity as desired at any area of the picture and thereby produce prints, subduing, intensifying or blending objects or parts thereof, as desired. Such a process is especially useful in trick photographing, wherein different pictures are combined to produce single pictures.

In carrying out my improved process, prints may be made in a machine having a lens, in which a negative or positive hereinafter called a "transparency" is placed over an unexposed film. Light is projected through the lens upon the transparency and the film and thus a print may be made. In the present process, the light projected through the film is preferably controlled by a light transmitting screen. This screen is arranged so that the intensity therethrough may be varied at will over its area to produce any variation in uniformity desired. This surface is touched to change its translucency in parts, that is to transmit more or less light.

In the accompanying drawing, certain apparatus is illustrated for carrying out the process. However, the process is in no way limited to utilization of the particular apparatus shown herein or to any particular apparatus.

Figure 2:
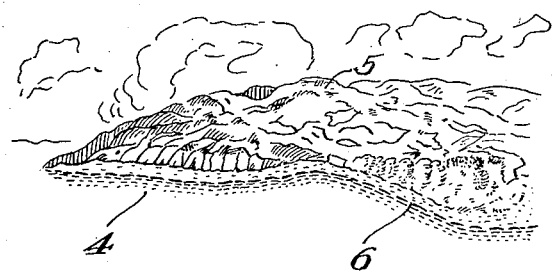
Figure 1:
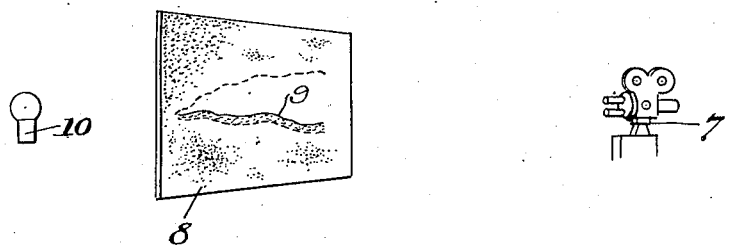

In the drawing, Fig. 1 is a perspective view of my apparatus for carrying out the steps of my invention. Fig. 2 is a view of a picture taken by my process.

In producing the picture shown in Fig. 2, the camera man has taken an exterior showing the shore line of an island. The picture has been taken and printed in the usual manner. The sea is indicated by 4. Back of the shore line are hills 5. A beach is indicated by 6. It is found upon the picture that the beach 6 shows too light, and it is advisable to tone down or subdue the color of the beach. My invention is intended to produce a toning down. For the purpose of printing positives from the negative, a moving picture camera may be used in which the negative is superimposed upon an unexposed film. Light may then be projected through the lens of the camera upon the film and a positive print thereby made. In my improved process, a positive made from the film is projected from the camera 7 upon a screen 8 preferably of ground glass. Suppose the picture produced is that shown in Fig. 2. The beach will show too light. An air brush is then used to touch up the screen to decrease its translucency along the area on the screen showing the beach, as indicated by 9. The postive is then removed, and a negative and unexposed film inserted for printing. The light is projected through the screen from a suitable source indicated for simplicity by a lamp 10 to the lens, upon the negative and through the latter to the unexposed film. The light projected will have been decreased at the beach zone by reason of subduing the latter with the touched portion. The result will be that less light will be projected through the lens upon this portion of the film and the positive printed will have a subdued tone. It is obvious that a negative may be made from this positive and prints made therefrom in the usual manner.

In the embodiment of my invention just disclosed, a white background is used with a negative for printing. The reverse operation may be resorted to wherein a positive is used to make a negative. It is obvious that an object may be blotted out and other objects brought out by properly touching up the screen. Variations of the process for particular purposes may be employed, as desired. Negatives or positives may be toned, one process being merely the reverse of the other. My process is especially useful in making trick pictures.

The invention resides in making a print by covering a sensitive film with a light transmitting medium having thereon areas of different light transmitting magnitude, and projecting light of different intensity as desired through the light transmitting medium. This light transmitting medium may be a positive or a negative as technically known in photography. In the claims, I have used the term "transparency" in the broad sense of a light transmitting medium having the picture defined by areas of different light transmitting magnitude.

The control of the light projected through the transparency is obtained by interposing in the field of light flux a light transmitting body and varying the translucency as desired. Thus, a single translucent screen may be used or a plurality of screens or fragments of screens. Any light transmitting body may be used as a screen and may be placed at a distance or against the superposed transparency and sensitive plate. Ground glass retouched or dyed, gauze of different thicknesses or having its surface treated by any means to vary its light transmitting qualities may be used. A film having its surface properly treated may be placed against the transparency or spaced from it. This screen may be made by retouching the surface of a reflecting screen as described in United States Patent No. 1,464,054 granted to me August 7, 1923, then photographing the reflector, and developing the film to produce a screen film, which is then placed in front of the transparency. It is also possible to color the screen film and transmit the effect to the transparency by either typing the same on the transparency or transferring the substance upon the screen film to the transparency.

What I claim is:

1. The herein described method of printing pictures, which consists in making a transparency of a scene, projecting the images of said transparency upon a light transmissive screen, varying the transmissivity thereof at different portions of the field, placing said transparency over a sensitized plate, and light impressing said plate by light transmitted through said screen and transparency.

2. The herein described method of printing pictures, which consists in projecting a picture from a transparency upon a light transmissive medium, varying the light transmitted through said medium by aid of the picture projected thereon, placing said transparency in front of a sensitized plate, and printing by means of light transmitted from said medium with the light intensity variations produced aforesaid.

In witness that I claim the foregoing I have hereunto subscribed my name this 21st day of March, 1927.

FRANK D. WILLIAMS.